G. W. CASSIDY.

HOOD OR SHADE FOR A LAMP.

APPLICATION FILED JUNE 8, 1918.

Reissued Aug. 27, 1918. 14,511.

Inventor:
George W. Cassidy
By his Attorney
Edmund Cooper Brown

UNITED STATES PATENT OFFICE.

GEORGE W. CASSIDY, OF NEW YORK, N. Y.

DESIGN FOR A HOOD OR SHADE FOR A LAMP.

14,511. Specification of Reissued Design. Reissued Aug. 27, 1918.

Original No. 51,255, dated September 11, 1917, Serial No. 183,374, filed July 28, 1917, for 7 years. Application for reissue filed June 8, 1918. Serial No. 238,998. Term of patent 7 years.

*To all whom it may concern:*

Be it known that I, GEORGE W. CASSIDY, a citizen of the United States, and a resident of the borough and county of Queens, in the city and State of New York, have invented a new, original, and ornamental Design for Hoods or Shades for Lamps, of which the following is a specification, reference being had to the accompanying drawings, forming part hereof.

Figure 2:
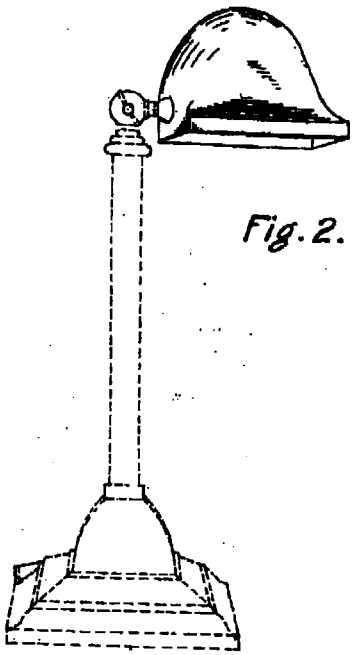
Figure 1:
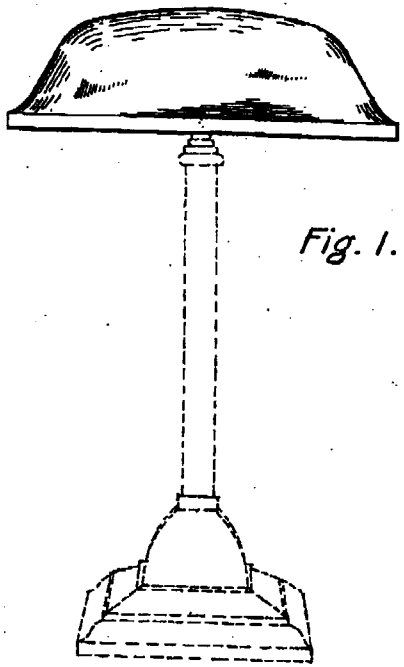

In the said drawings Figures 1 and 2 are perspective views of the front and end respectively of a hood or shade showing my new design.

I claim:

The ornamental design for a hood or shade for a lamp, as shown.

In witness whereof I have hereunto signed my name this 18th day of May, 1918.

GEORGE W. CASSIDY.

Copies of this patent may be obtained for five cents each, by addressing the "Commissioner of Patents, Washington, D. C."